(12) United States Patent
Kurian

(10) Patent No.: US 10,992,681 B2
(45) Date of Patent: Apr. 27, 2021

(54) AUTHENTICATION USING BLOCKCHAINS

(71) Applicant: BANK OF AMERICA CORPORATION, Charlotte, NC (US)

(72) Inventor: Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 308 days.

(21) Appl. No.: 16/287,856

(22) Filed: Feb. 27, 2019

(65) Prior Publication Data

US 2020/0274878 A1 Aug. 27, 2020

(51) Int. Cl.
*H04L 29/06* (2006.01)
*G06F 21/31* (2013.01)
*G06F 21/62* (2013.01)
*H04L 9/06* (2006.01)

(52) U.S. Cl.
CPC .......... *H04L 63/102* (2013.01); *G06F 21/316* (2013.01); *G06F 21/6254* (2013.01); *H04L 9/0618* (2013.01); *H04L 63/0861* (2013.01); *H04L 63/107* (2013.01); *H04L 2209/38* (2013.01)

(58) Field of Classification Search
CPC . H04L 63/102; H04L 63/0861; H04L 63/107; H04L 2209/38; G06F 21/316; G06F 21/6254
See application file for complete search history.

(56) References Cited

U.S. PATENT DOCUMENTS

| | | | |
|---|---|---|---|
| 8,336,091 B2 | 12/2012 | Wong | |
| 8,769,657 B2 | 7/2014 | Zaitsev | |
| 8,805,726 B2 | 8/2014 | Fisher | |
| 9,026,623 B2 | 5/2015 | Wang et al. | |
| 9,147,061 B1 | 9/2015 | McClendon et al. | |
| 9,749,790 B1 | 8/2017 | Haney | |
| 9,854,394 B1 | 12/2017 | Haney | |
| 9,864,853 B2 | 1/2018 | Boivie | |
| 9,942,705 B1 | 4/2018 | Haney | |
| 10,007,772 B2 | 6/2018 | Slaby et al. | |
| 10,129,269 B1 * | 11/2018 | Ford | H04L 67/22 |

(Continued)

OTHER PUBLICATIONS

Kurian, M.J., "Information Security Using Blockchains," U.S. Appl. No. 16/287,815, filed Feb. 27, 2019, 31 pages.

*Primary Examiner* — Catherine Thiaw
(74) *Attorney, Agent, or Firm* — Michael A. Springs

(57) ABSTRACT

An authentication device that includes a memory operable to store a behavior signature for a user and a distributed ledger comprising information for a private blockchain and a semi-private blockchain associated with the user. The network device further includes an authentication engine implemented by a processor. The authentication engine is configured to receive an authentication request for a network resource and to determine a resource classification type based on the network resource. The authentication engine is further configured to identify one of the private blockchain and the semi-private blockchain based on the resource classification type and to extract data from one or more blocks in the identified blockchain. The authentication engine is further configured to determine at least a portion of the extracted data matches the stored behavior signature for the user and to provide access to the network resource in response to the determination.

20 Claims, 5 Drawing Sheets

(56) References Cited

U.S. PATENT DOCUMENTS

| | | | |
|---|---|---|---|
| 2017/0230375 A1* | 8/2017 | Kurian | H04L 63/102 |
| 2017/0244721 A1* | 8/2017 | Kurian | H04L 63/105 |
| 2018/0103020 A1 | 4/2018 | Moiyallah, Jr. et al. | |
| 2018/0225456 A1 | 8/2018 | Barsness et al. | |
| 2018/0225457 A1 | 8/2018 | Barsness et al. | |
| 2018/0307859 A1* | 10/2018 | LaFever | G16H 10/60 |
| 2018/0316671 A1 | 11/2018 | Brown | |
| 2019/0370866 A1* | 12/2019 | Lawbaugh | H04L 9/0637 |
| 2020/0007344 A1* | 1/2020 | Chepak, Jr. | H04L 9/0643 |
| 2020/0136847 A1* | 4/2020 | Serwatowski | H04L 9/3297 |
| 2020/0159890 A1* | 5/2020 | Chui | G06F 16/25 |

\* cited by examiner

AUTHENTICATION USING BLOCKCHAINS

TECHNICAL FIELD

The present disclosure relates generally to information security, and more specifically to access control and authentication for network resources.

BACKGROUND

Conventional systems typically authenticate users using static authentication credentials. For example, a conventional system may authenticate a user using a username and password combination with a predefined number of security questions. Because conventional systems use a static authentication processes, bad actors can access a user's sensitive information if they are able to obtain the user's authentication credentials. Once a bad actor has access to the user's information they can pose as the user to perform malicious activities, such as data exfiltration, or to gain unauthorized access to network resources. Thus, it is desirable to provide increased data access control and information security to prevent unauthorized access to network resources and information stored in a network.

SUMMARY

Conventional systems typically authenticate users using static authentication credentials. For example, a conventional system may authenticate a user using a username and password combination with a predefined number of security questions. Because conventional systems use a static authentication processes, bad actors can access a user's sensitive information if they are able to obtain the user's authentication credentials. Once a bad actor has access to the user's information they can pose as the user to perform malicious activities, such as data exfiltration, or to gain unauthorized access to network resources.

In addition, authenticating a user's identity also poses several technical challenges. In a conventional system, the system relies on provided information to confirm the identity of the user. This means that anyone who provides the authentication credentials for a user can pose as the user. For example, if a bad actor is able to obtain a user's authentication credentials, then the bad actor will be able to spoof the system into authenticating the bad actor as the user. Conventional systems are unable to detect or determine whether the authentication information is being provided by the actual user or a bad actor posing as the user. This limitation leaves the network vulnerable to attacks by bad actors posing as other users in order to gain access network resources and information stored in the network.

The system described in the present application provides a technical solution to the technical problems discussed above by employing an information security architecture that uses private blockchains and semi-private blockchains for authentication. The disclosed system provides several advantages which include 1) the ability to securely store and share user information using a private blockchain and a semi-private blockchain and 2) the ability to perform authentication based on a user's recent activity instead of relying on only static authentication credentials.

In one embodiment, a network node is configured to store user information that is collected from one or more user devices for a user in the private blockchain and the semi-private blockchain. The private blockchain and the semi-private blockchain are configured to mirror each other, however, the semi-private blockchain restricts access to some of the user information by using anonymized blocks. This means that some devices (e.g. trusted devices) can have full access to the information in the private blockchain while other devices have limited access to the same information via the semi-private blockchain.

In one embodiment, an authentication device is configured to receive an authentication request for access to a network resource from a user. The authentication device is configured to extract user information from the private blockchain or the semi-private blockchain and to compare the extracted information to a behavior signature linked with the user. Here, the extracted information comprises user information that is collected from one or more user devices that are associated with the user over time. The behavior signature describes a typical behavior for the user. The authentication device determines whether the user passes authentication based on the comparison between the extracted user information and the behavior signature. This process allows the authentication device to authenticate the user based on their recent activities rather than only relying on a static set of authentication credentials. This process improves information security because a bad actor will need to gain access to multiple user devices and will need knowledge of the user's typical behavior in order to pass authentication.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by employing an information security architecture that uses private blockchains and semi-private blockchains for authentication. The disclosed system provides several advantages which include 1) the ability to securely store and share user information using a private blockchain and a semi-private blockchain and 2) the ability to perform authentication based on a user's recent activity instead of relying on only static authentication credentials.

Figure 1:
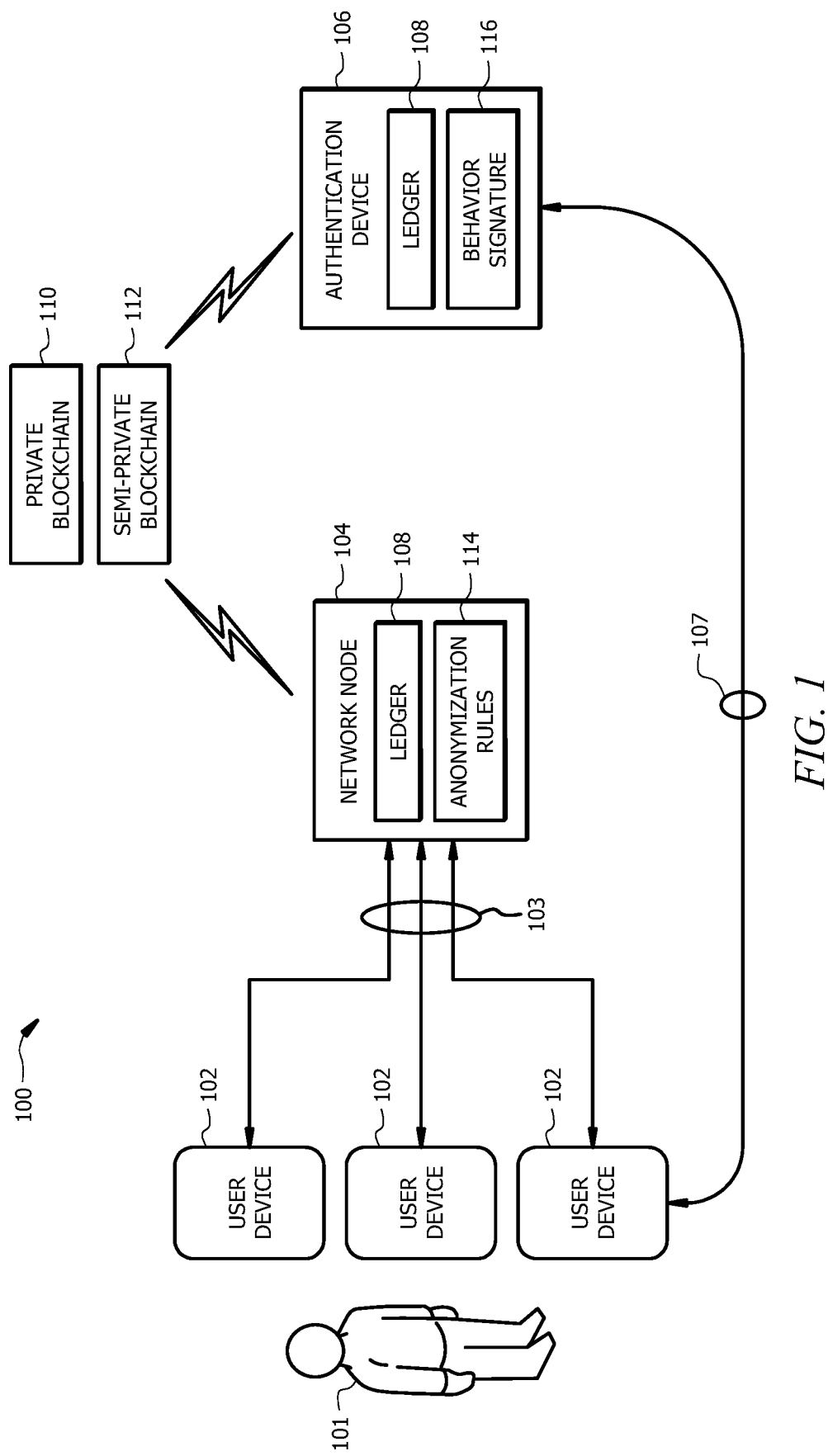
FIG. 1 is a schematic diagram of an embodiment of an information security system that uses private blockchains and semi-private blockchains.
Figure 2:
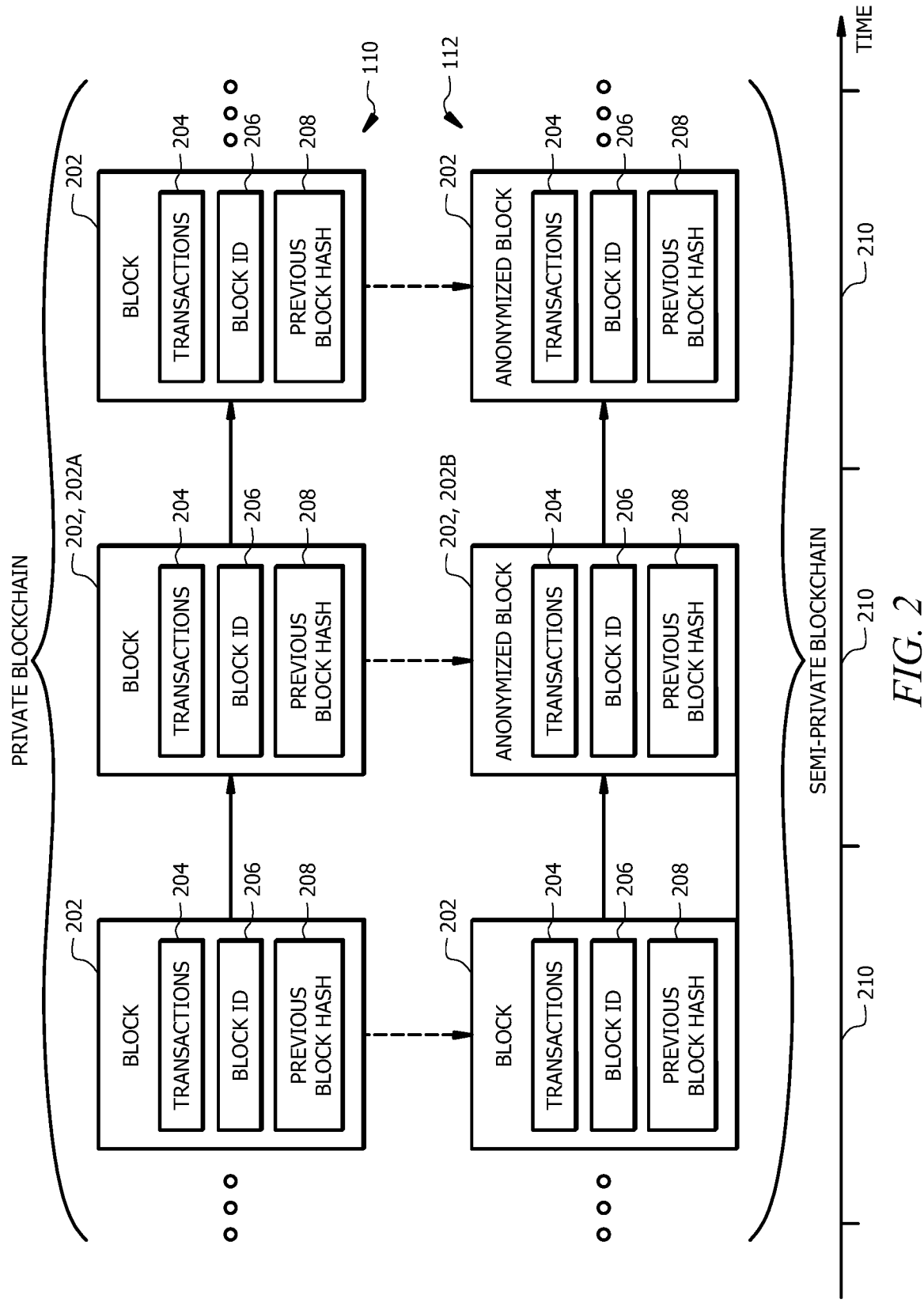
FIG. 2 is an illustrated example of a mapping between a private blockchain and a semi-private blockchain.
Figure 3:
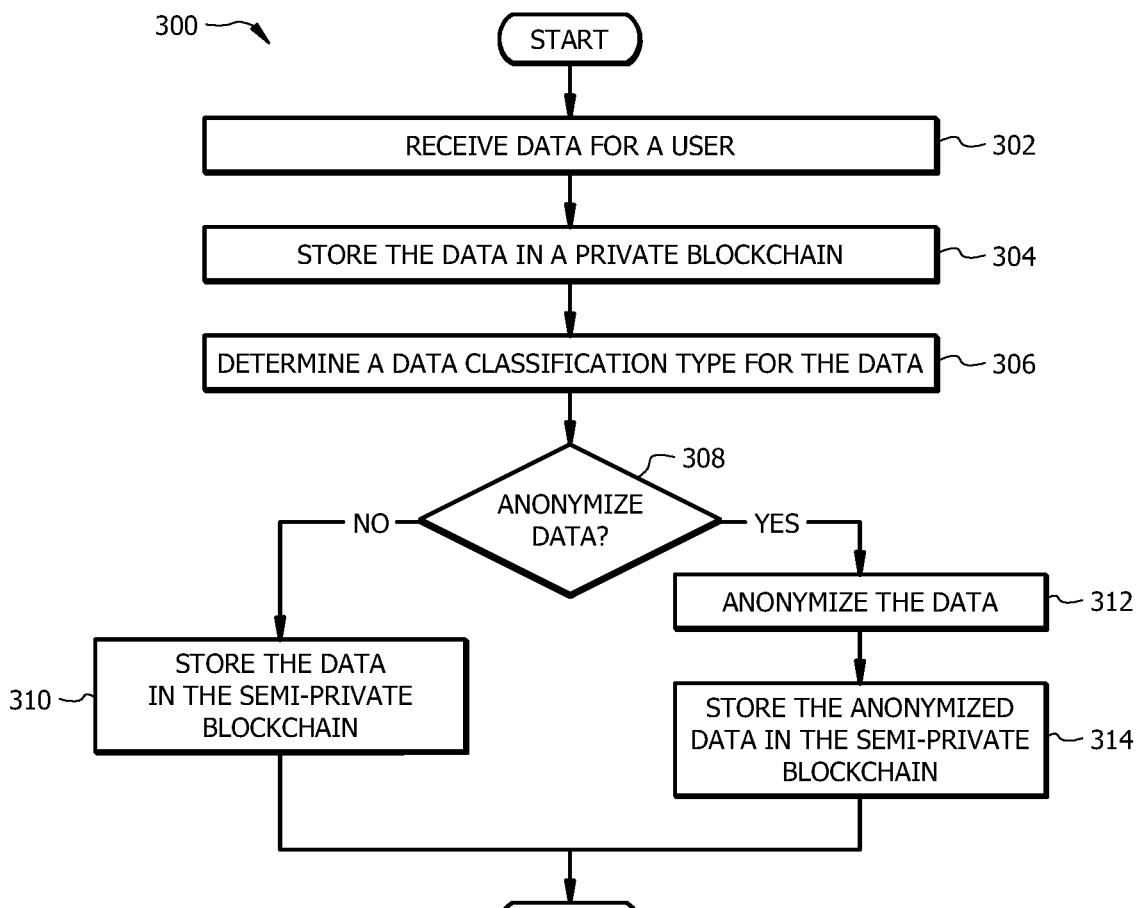
FIG. 3 is a flowchart of an embodiment of an information security method implemented by the information security system.
Figure 4:
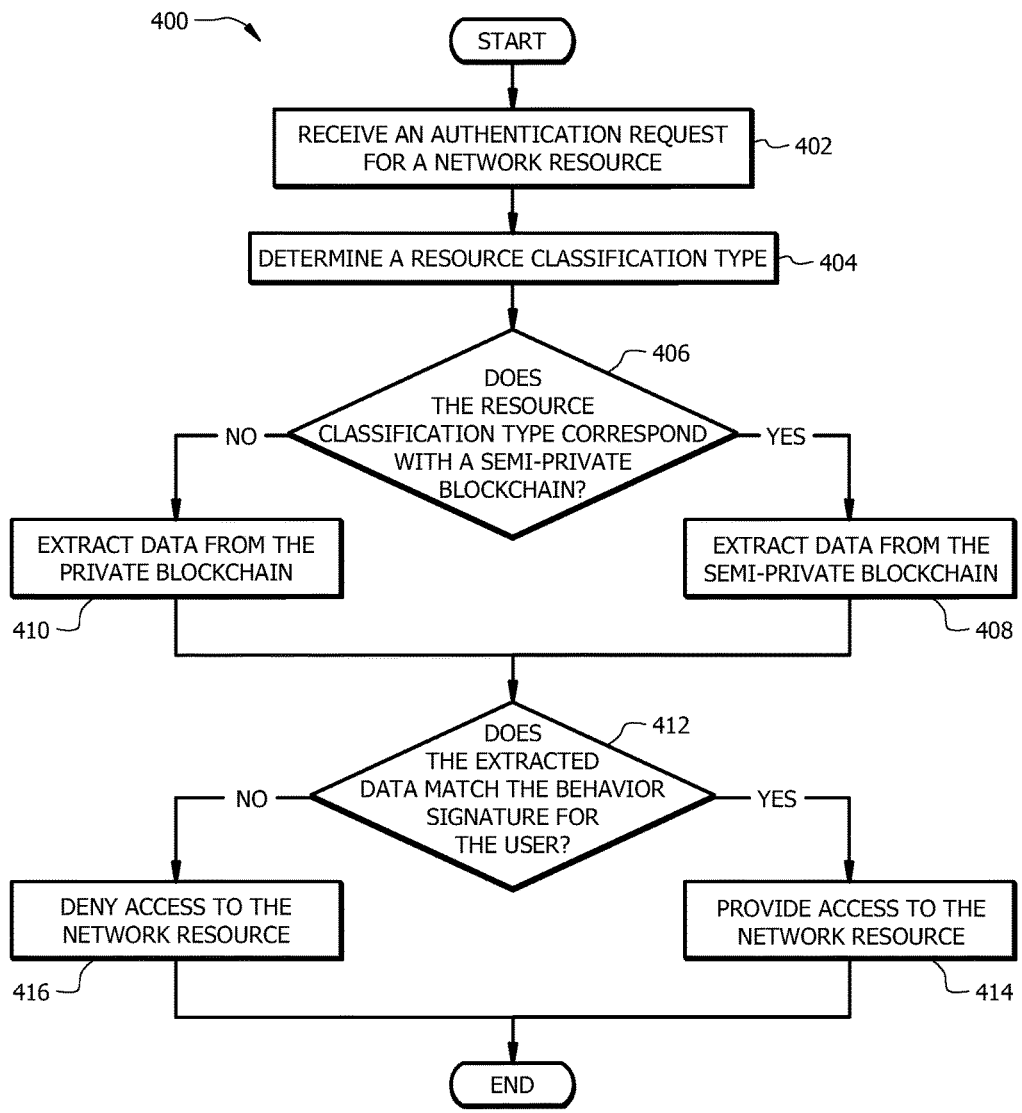
FIG. 4 is a flowchart of an embodiment of an authentication method implemented by the information security system.
Figure 5:
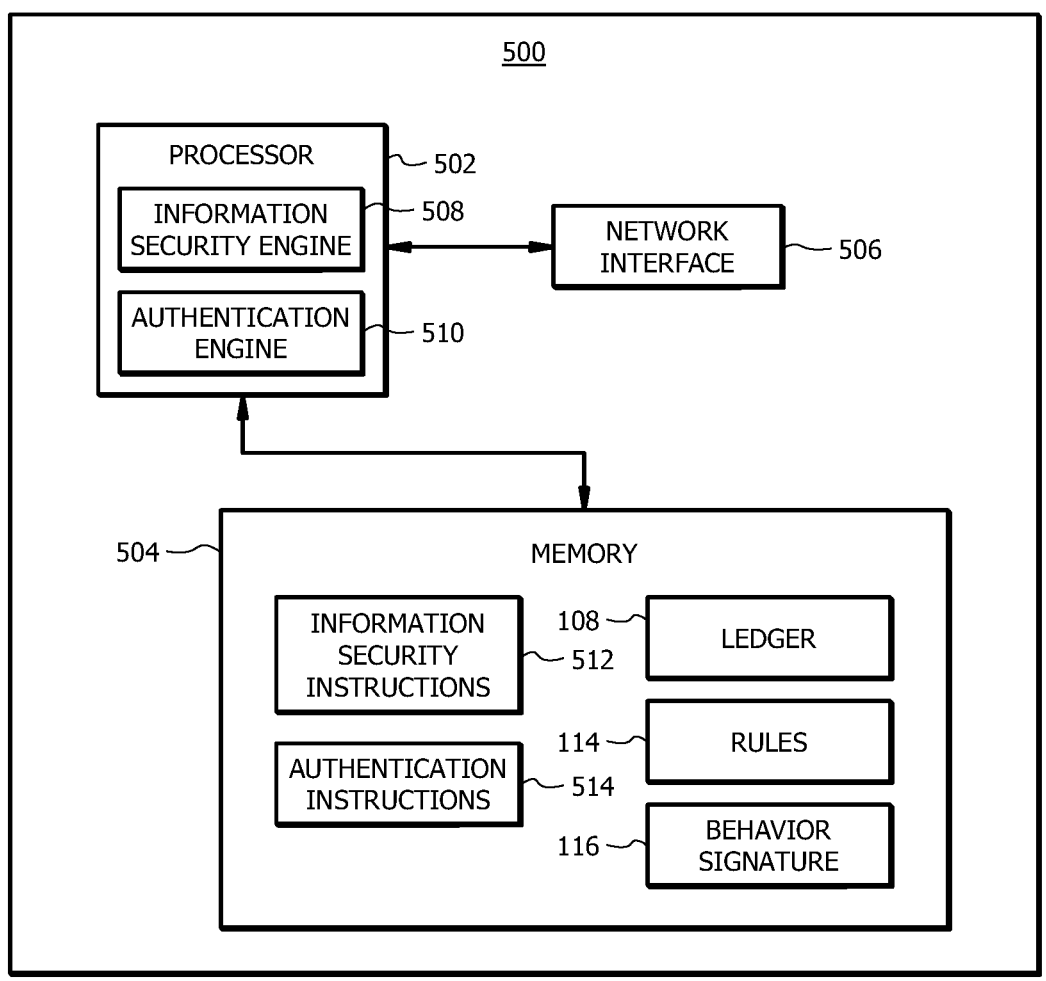
FIG. 5 is a schematic diagram of an embodiment of a device configured to implement an information security architecture.

FIG. 1 is an example of a system configured to implement an information security architecture that uses private blockchains and semi-private blockchains. FIG. 2 is an example of the relationship between a private blockchain and a semi-private blockchain. FIG. 3 is an example of process for storing information in a private blockchain and a semi-private blockchain. FIG. 4 is an example of a process for retrieving information from a private blockchain or a semi-private blockchain for authenticating a user. FIG. 5 is an example of a device configured to implement the information security architecture.

Information Security System

FIG. 1 is a schematic diagram of an embodiment of an information security system 100. The information security system 100 provides an architecture that can be used to securely store user information in a private blockchain 110 and semi-private blockchain 112 and to retrieve information stored in the private blockchain 110 and the semi-private blockchain 112 for authenticating a user 101. The information security system 100 may be configured as shown in FIG. 1 or in any other suitable configuration.

The information security system 100 comprises a network node 104 (e.g. a server) in signal communication with one or more user devices 102 that are associated with a user 101. The network node 104 is configured to periodically receive user information 103 from the one or more user devices 102. Examples of user information 103 include, but are not limited to, location information, user device information, biometric information, financial transactions, medical history, personal information, or any other type of information. Examples of user devices 102 include, but are not limited to, computers, mobile devices (e.g. smart phones or tablets), Internet-of-things (IoT) devices, or any other suitable type of device.

The network node 104 and the user devices 102 may be in signal communication with each other over a network connection. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art upon viewing this disclosure The network node 104 comprises a distributed ledger 108 that contains a private blockchain 110 and semi-private blockchain 112 that are associated with a user 101. The network node 104 is configured to store user information 103 that is collected from one or more user devices 102 for the user 101 in the private blockchain 110 and the semi-private blockchain 112. The private blockchain 110 and the semi-private blockchain 112 are configured to mirror each other, however, the semi-private blockchain 112 restricts access to some of the user information 103 by using anonymized blocks. Additional information about the private blockchain 110 and the semi-private blockchain 112 are described in FIG. 2. The distributed ledger 108 stores copies of the private blockchain 110 and the semi-private blockchain 112 and their executed transactions (e.g. user information 103). When the network node 104 publishes an entry in its ledger 108 for a blockchain (e.g. the private blockchain 110 and the semi-private blockchain 112), the ledgers 108 for all the other network nodes 104 and authentication devices 106 in the distributed network is also updated with the new entry. This allows data published in a blockchain to be available and accessible to every network node 104 and authentication device 106 with a copy of the ledger 108. This accessibility allows the information in the blockchain to be verified and validated by any other devices in the network. Additional details about storing information in a private blockchain 110 and a semi-private blockchain 112 is described in FIG. 3.

The network node 104 further comprises a set of anonymization rules that comprise instructions for storing data in the semi-private blockchain 112. The anonymization rules 114 may be user defined and may specify which types of data should be anonymized before they are stored in the semi-private blockchain 112. In one embodiment, each anonymization rule 114 may be linked with a data classification type and indicates whether to anonymize data associated with the data classification type before storing the data in the semi-private blockchain 112. The anonymization rules 114 may also indicate an anonymization technique for anonymizing data. Additional information about the anonymization process is described in FIG. 3.

The information security system 100 further comprises an authentication device 106 (e.g. a server) configured to retrieve information stored in the private blockchain 110 and the semi-private blockchain 112 for authenticating a user 101. The authentication device 106 comprises the distributed ledger 108 and a behavior signature 116 for one or more users 101. The distributed ledger 108 is configured similar to the distributed ledger 108 stored in the network node 104. The behavior signature 116 comprises user information aggregated from one or more user devices 102 over time for a user 101. The aggregated user information forms a behavior profile that describes a typical behavior for the user 101. For example, behavior profile 106 may identify location information, biometric information, user device activity information, or any other suitable type of information for the user 101.

In one embodiment, the authentication device 106 is configured to receive an authentication request 107 from a user 101. The authentication device 106 is configured to extract user information 103 from the private blockchain 110 or the semi-private blockchain 112, to compare the extracted information 103 to a behavior signature 116 linked with the user 101, and to determine whether the user 101 passes authentication based on the comparison. Additional details about retrieving information stored in the private blockchain 110 and the semi-private blockchain 112 for authenticating a user 101 is described in FIG. 4.

Private Blockchains and Semi-Private Blockchains

FIG. 2 is an illustrated example of a mapping between a private blockchain 110 and a semi-private blockchain 112. A blockchain generally refers to a database shared by a plurality of devices (e.g. network nodes 104 or authentication devices 106) in a network. An information security system 100 may employ any suitable number of devices (e.g. network nodes 104 and authentication device 106) to form a distributed network that maintains a private block chain 110 and a semi-private blockchain 112.

Each blockchain links together blocks 202 of data which comprise identifiable units called transactions 204. Transactions 204 may comprise information, files, or any other suitable type of data. For example, a transaction 204 may comprise user information 103 associated with a user 101 such as location information, user device information, biometric information, financial transactions, medical history, personal information, or any other type of information.

Each block 202 in the blockchain comprises a block identifier 206 and information derived from a preceding block 202. For example, every block 202 in the blockchain includes a hash 208 of the previous block 202. By including the hash 208, the blockchain comprises a chain of blocks 202 from a genesis block 202 to the current block 202. Each block 202 is guaranteed to come after the previous block 202 chronologically because the previous block's hash 208 would otherwise not be known. In one embodiment, blocks 202 in a blockchain may be linked together by identifying a preceding block with a cryptographic checksum (e.g. secure hash algorithm (SHA)-256) of its contents (e.g. the transaction and additional metadata) which serves as each block's unique identifier. Links are formed by storing the cryptographic checksum identifier of one block 202 in the metadata of another block 202, such that the former block 202 becomes the predecessor of the latter block 202. In this way, the blocks 202 form a chain that can be navigated from block-to-block by retrieving the cryptographic checksum of a particular block's predecessor from the particular block's own metadata. Each block 202 is computationally impractical to modify once it has been in the block chain because every block 202 after it would also have to be regenerated. These features protect data stored in the block chain from being modified by bad actors which provides information security. When a network node publishes an entry (e.g. one or more transactions 204 in a block 202) in its ledger 108, the blockchain for all other devices in the distributed network is also updated with the new entry. Thus, data published in a blockchain is available and accessible to every network node 104 with a ledger 108. This allows the data stored in the block 202 to be accessible for inspection and verification at any time by any device with a copy of the ledger 108.

The private blockchain 110 is configured to store user information associated with one or more users 101 over time. For example, the data may be stored in the private blockchain 110 at predetermined time intervals 210. The semi-private blockchain 112 is configured such that blocks 202 in the semi-private blockchain 112 mirror blocks 202 in the private blockchain 110. In other words, blocks 202 are synchronized with respect to time. Both the private blockchain 110 and the semi-private blockchain 112 comprise a history of user information 103 for a user 101. However, the semi-private blockchain 112 comprises one or more anonymized blocks 202 that at least partially redact information from the private blockchain 110. Using anonymized blocks 202 allows the semi-private blockchain 112 to restrict visibility to some of the user's activities. For example, the private blockchain 110 may comprise a block 202A that contains location information for a user 101. The semi-private blockchain 112 may comprise a corresponding block 202B where the location information for the user 101 has been anonymized or obfuscated. In this example, devices can obtain the user's location information from the private blockchain 100 but are unable to obtain the user's location information from the semi-private blockchain 112. This process allows for selective access to information stored in the private blockchain 110 and the semi-private blockchain 112.

This means that some devices (e.g. trusted devices) can have full access to the information in the private blockchain 110 while other devices have limited access to the same information via the semi-private blockchain 112. Additional information about the anonymization process is described in FIG. 3.

Storing Information Process

FIG. 3 is a flowchart of an embodiment of an information security method 300 implemented by the information security system 100. A device (e.g. network node 104) may use an information security engine 508 to employ method 300 to store user information in a private blockchain 110 and a semi-private blockchain 112. Additional details about the device and the information security engine 508 are described in FIG. 5.

At step 302, the information security engine 508 receives data (e.g. user information 103) for a user 101 from one or more user devices 102. In one embodiment, the information security engine 508 is configured to periodically receive data from one or more user devices 102 associated with the user 101 at predetermined time intervals. For example, the information security engine 508 may be configured to receive data every thirty seconds, every minute, every five minutes, every thirty minutes, or at any other suitable time interval. In one embodiment, the information security engine 508 may be configured to request data from the one or more user devices 102. For example, the information security engine 508 may periodically send a request to the one or more user devices 102 and may receive data in response to the request. In this example, the information security engine 508 may employ any suitable technique to send a data request to the one or more user devices 102 as would be appreciated by one of ordinary skill in the art. In another embodiment, the information security engine 508 may passively receive data from the one or more user devices 102.

At step 304, the information security engine 508 stores the data in a private blockchain 110 by publishing an entry with the data in the ledger 108 of the private blockchain 110. The entry comprises at least a portion of the data received from the one or more user devices 102. The ledgers 108 in other devices are all updated with the data in response to publishing the data in the ledger 108.

At step 306, the information security engine 508 determines a classification type for the data. The information security engine 508 may determine whether the data is associated with location information, user device information, biometric information, financial transactions, medical history, personal information, or any other classification type based on the contents of the data. For example, the data may comprise global positioning system (GPS) coordinates and the information security engine 508 may associate the data with a location information data classification type.

At step 308, the information security engine 508 determines whether to anonymize the data based on its data classification type. The information security engine 508 uses the anonymization rules 114 for determining whether to anonymize the data. The anonymization rules 114 identify the data classification types that should be anonymized before storing data in the semi-private blockchain 112. For example, the anonymization rules 114 may indicate that certain types of user information 103, such as medical information or transaction information, should be anonymized before storing the data in the semi-private blockchain 112. As another example, the anonymization rules 114 may indicate that other types of user information 103, such as location information, do not need to be anonymized before storing the data in the semi-private blockchain 112. The information security engine 508 proceeds to step 310 in response to determining not to anonymize the data.

At step 310, the information security engine 508 stores the data in the semi-private blockchain 112 by publishing an entry with the data in the ledger 108 of the semi-private blockchain 112. The entry comprises at least a portion of the data received from the one or more user devices 102. The ledgers 108 in other devices are all updated with the data in response to publishing the data in the ledger 108.

Returning to step 308, the information security engine 508 proceeds to step 312 in response to determining to anonymize the data. At step 312, the information security engine 508 anonymizes the data in accordance with the anonymization rules 114. Here, the information security engine 508 anonymizes the data to prevent the data from being understood by other devices (e.g. authorization devices 106). The anonymization rules 114 may identify an anonymization technique for the data based on its data classification type. As an example, the information security engine 508 may anonymize the data by replacing the data with predetermined padding data to generate the anonymized data. For instance, the information security engine 508 may replace the data with a particular value, such as all zeros, to anonymize the data. As another example, the information security engine 508 may anonymize the data by encrypting the data to generate the anonymize data. In this example, the information security engine 508 may use an encryption key that is not shared with other devices. This means that other devices will not be able to decrypt the encrypted data to determine or recover the original contents of the anonymized data. In other examples, the information security engine 508 may employ any other suitable technique for anonymizing the data.

At step 314, the information security engine 508 stores the anonymized data in the semi-private blockchain 112 by publishing an entry with the anonymized data in the ledger 108 of the semi-private blockchain 112. The entry comprises at least a portion of the data received from the one or more user devices 102. The ledgers 108 in other device are all updated with the anonymized data in response to publishing the data in the ledger 108.

In one embodiment, the information security engine 508 is configured to tokenize the data before storing the data in the private blockchain 110 or the semi-private blockchain 112. For example, the information security engine 508 may apply an encryption function or hashing function to obfuscate the data before publishing the data in the ledger 108. In this example, the keys or functions used to encrypt the data are shared with other devices so that the tokenized data can be later detokenized and recovered.

Retrieving Information Process

FIG. 4 is a flowchart of an embodiment of an authentication method 400 implemented by the information security system 100. A device (e.g. authentication device 106) may use an authentication engine 510 to employ method 400 to retrieve information stored in the private blockchain 110 and the semi-private blockchain 112 for authenticating a user 101. Additional details about the device and the authentication engine 510 are described in FIG. 5. Method 400 may be implemented as a stand-alone authentication process or may be integrated with other existing authentication processes.

At step 402, the authentication engine 510 receives an authentication request 107 from a user device 102 associated with the user 101 for a network resource. The authorization request 107 may identify one or more network resources that the user 101 is requesting access to. Examples of network resources include, but are not limited to, information, documents, files, services, applications, virtual resources, cloud resources, or any other suitable type of network resource.

At step 404, the authentication engine 510 determines a resource classification type based on the type of network resource that is being requested. For example, the authorization request 107 may comprise an identifier that identifies a network resource and its resource classification type. In other examples, the authentication engine 510 may employ any other suitable technique for identifying a resource classification type.

At step 406, the authentication engine 510 determines whether the resource classification type corresponds with a semi-private blockchain 112. For example, the authentication engine 510 may be configured to associate certain resource classification types with a semi-private blockchain 112. Here, the authentication engine 510 determines whether the determined resource classification type matches any of the previously defined resource classification types that are associated with a semi-private blockchain 112. The authentication engine 510 proceeds to step 408 in response to determining that the resource classification type corresponds with a semi-private blockchain 112.

At step 408, the authentication engine 510 extracts data from the semi-private blockchain 112. Here, the authentication engine 510 identifies and extracts data from one or more blocks 202 in the ledger 108 for the semi-private blockchain 112. In one embodiment, the authentication engine 510 may identify one or more blocks 202 within a predetermined time period of the current time. For example, the authentication engine 510 may identify blocks 202 that were published within the last thirty minutes, within the last five minutes, or within any other suitable amount of time. The authentication engine 510 may discard or ignore any anonymized blocks 202 that are identified within the predetermined time period. In one embodiment, authentication engine 510 may detokenize the extracted data from the semi-private blockchain 112 to recover the original data. For example, the authentication engine 510 may apply one or more encryption keys or dehashing functions to detokenize the data extracted from the semi-private blockchain 112.

Returning to step 406, the authentication engine 510 proceeds to step 410 in response to determining that the resource classification type does not correspond with a semi-private blockchain 112. At step 410, the authentication engine 510 extracts data from the private blockchain 110. Here, the authentication engine 510 identifies and extracts data from one or more blocks 202 in the ledger 108 for the private blockchain 110. The authentication engine 510 may identify one or more blocks 202 within a predetermined time period of the current time using a process similar to the process described in step 408.

In one embodiment, authentication engine 510 may detokenize the extracted data from the private blockchain 110 to recover the original data. For example, the authentication engine 510 may apply one or more encryption keys or dehashing functions to recover the original data to detokenize the data extracted from the private blockchain 110.

At step 412, the authentication engine 510 determines whether the extracted data matches a behavior signature 116 for the user 101. As an example, the behavior signature 116 may identify a set of locations the user 101 frequently visits and the extracted data may comprise recent location information for the user 101 obtained by the one or more user devices 102. In this example, the authentication engine 510 compares the recent location information for the user 101 to the set of locations that the user 101 frequently visits. The authentication engine 510 then determines whether any of the recently visited locations match any of the locations that the user 101 frequently visits. The authentication engine 510 may be configured to determine that the extracted data at least partially matches the behavior signature 116 for the user 101 when the number of matching locations meets or exceeds a predefined threshold value. For example, the authentication engine 510 may determine that the extracted data matches the behavior signature 116 for the user 101 when at least two of the locations match. In other example, the authentication engine 510 may determine that the extracted data matches the behavior signature 116 for the user 101 when any other suitable number of locations match.

As another example, the behavior signature 116 may comprise biometric information for the user 101. For example, the biometric information may identify an average heart rate, an average blood pressure, an average body temperature, or any other suitable type of biometric information for the user 101. The extracted data may comprise recent biometric information for the user 101 obtained by the one or more user devices 102. In this example, the authentication engine 510 compares the recent biometric information for the user 101 to the previously stored biometrics for the user 101 to determine whether any of the biometric information matches for the user 101.

As another example, the behavior signature 116 may comprise user activity information associated with one or more user devices 102 associated with the user 101. For example, the user activity information may identify applications that the user 101 frequently interacts with, web pages that the user 101 frequently visits, or any other type of activity performed by the user 101 on a user device 102. The extracted data may comprise recent user activity on the one or more user devices 102. In this example, the authentication engine 510 compares the recent user activity on the one or more user devices 102 to the previously stored user activity information to determine whether any of the user activity information matches.

In other examples, the behavior signature 116 may comprise any other suitable type or combination of information associated with the user 101. The authentication engine 510 may compare any type of extracted data to determine whether the extracted data at least partially matches or is consistent with the information in the behavior signature 116.

The authentication engine 510 proceeds to step 414 in response to determining that the extracted data at least partially matches the behavior signature 116 for the user 101. At step 414, the authentication engine 510 authenticates the user 101 based on the recent activity for the user 10 and provides access to the requested network resources.

Returning to step 412, the authentication engine 510 proceeds to step 416 in response to determining that the extracted data does not at least partially match the behavior signature 116 for the user 101. At step 416, the authentication engine 510 determines that the user 101 does not pass authentication based on the recent activity for the user 101 and denies access to the requested network resources.

Information Security and Authentication Device

FIG. 5 is a schematic diagram of an embodiment of a device 500 (e.g. network node 104 or authentication device 106) configured to implement an information security architecture. The device 500 comprises a processor 502, a memory 504, and a network interface 506. The device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the information security engine 508 and the authentication engine 510. In this way, processor 502 may be a special purpose computer designed to implement function disclosed herein. In an embodiment, the information security engine 508 and the authentication engine 510 are implemented using logic units, FPGAs, ASICs, DSPs, or any other suitable hardware. The information security engine 508 and the authentication engine 510 are configured as described in FIGS. 3 and 4, respectively.

The memory 504 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The memory 504 is operable to store information security instructions 512, authentication instructions 514, ledgers 108, anonymization rules 114, behavior signatures 116, and/or any other data or instructions. The information security instructions 512 and the authentication instructions 514 may comprise any suitable set of instructions, logic, rules, or code operable to execute the information security engine 508 and the authentication engine 510, respectively. The ledgers 108, the anonymization rules 114, and the behavior signatures 116 are configured similar to the ledgers 108, the anonymization rules 114, and the behavior signatures 116 described in FIG. 1, respectively.

The network interface 506 is configured to enable wired and/or wireless communications. The network interface 506 is configured to communicate data between the device 500 and other devices (e.g. user devices 102, network nodes 104, or authentication device 106), systems, or domain. For example, the network interface 506 may comprise a WIFI interface, a local area network (LAN) interface, a wide area network (WAN) interface, a modem, a switch, or a router.

The processor 502 is configured to send and receive data using the network interface 506. The network interface 506 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An authentication device, comprising:
   a network interface configured to communicate with a user device associated with a user;
   a memory operable to store:
      a behavior signature for the user, wherein the behavior signature is based on information aggregated by one or more user devices associated with the user; and
      a distributed ledger comprising information for:
         a private blockchain associated with the user; and
         a semi-private blockchain associated with the user, wherein:
            blocks in the semi-private blockchain mirror blocks in the private blockchain; and
            the semi-private blockchain comprises one or more anonymized blocks;
   an authentication engine implemented by a processor operably coupled to the network interface and the memory, configured to:
      receive an authentication request from the user device, wherein the authentication request requests access to a network resource;
      determine a resource classification type based on the network resource;
      identify one of the private blockchain and the semi-private blockchain based on the resource classification type;
      extract data from one or more blocks in the identified blockchain;
      compare the extracted data to the stored behavior signature for the user;
      determine at least a portion of the extracted data matches the stored behavior signature for the user; and
      provide access to the network resource in response to the determination that at least a portion of the extracted data matches the stored behavior signature for the user.

2. The device of claim 1, wherein the behavior signature comprises location information for the user.

3. The device of claim 1, wherein extracting the data from the one or more blocks comprises identifying the one or more blocks from within a predetermined time period of the identified blockchain.

4. The device of claim 1, wherein the behavior signature comprises user activity information associated with the one or more user devices.

5. The device of claim 1, wherein extracting the data from the one or more blocks comprises:
   extracting a token from the identified blockchain; and
   processing the token to recover the data.

6. The device of claim 1, wherein:
   the identified blockchain is the semi-private blockchain; and
   extracting the data from the one or more blocks comprises discarding data from one or more anonymized blocks.

7. The device of claim 1, wherein the behavior signature comprises biometric information for the user.

8. An authentication method, comprising:
   receiving, by an authentication engine implemented by a processor, an authentication request from a user device, wherein the authentication request requests access to a network resource;
   determining, by the authentication engine, a resource classification type based on the network resource;
   identifying, by the authentication engine, one of a private blockchain and a semi-private blockchain based on the resource classification type, wherein:
      the private blockchain and the semi-private blockchain are associated with the user;
      blocks in the semi-private blockchain mirror blocks in the private blockchain; and
      the semi-private blockchain comprises one or more anonymized blocks;
   extracting, by the authentication engine, data from one or more blocks in the identified blockchain;
   comparing, by the authentication engine, the extracted data to a stored behavior signature for the user, wherein the behavior signature is based on information aggregated by one or more user devices associated with the user;
   determining, by the authentication engine, at least a portion of the extracted data matches the stored behavior signature for the user; and
   providing, by the authentication engine, access to the network resource in response to the determination that at least a portion of the extracted data matches the stored behavior signature for the user.

9. The method of claim 8, wherein the behavior signature comprises location information for the user.

10. The method of claim 8, wherein extracting the data from the one or more blocks comprises identifying the one or more blocks from within a predetermined time period of the identified blockchain.

11. The method of claim 8, wherein the behavior signature comprises user activity information associated with the one or more user devices.

12. The method of claim 8, wherein extracting the data from the one or more blocks comprises:
extracting a token from the identified blockchain; and
processing the token to recover the data.

13. The method of claim 8, wherein:
the identified blockchain is the semi-private blockchain; and
extracting the data from the one or more blocks comprises discarding data from one or more anonymized blocks.

14. The method of claim 8, wherein the behavior signature comprises biometric information for the user.

15. A computer program comprising executable instructions stored in a non-transitory computer readable medium that when executed by a processor causes the processor to:
receive an authentication request from a user device, wherein the authentication request requests access to a network resource;
determine a resource classification type based on the network resource;
identify one of a private blockchain and a semi-private blockchain based on the resource classification type, wherein:
the private blockchain and the semi-private blockchain are associated with the user;
blocks in the semi-private blockchain mirror blocks in the private blockchain; and
the semi-private blockchain comprises one or more anonymized blocks;
extract data from one or more blocks in the identified blockchain;
compare the extracted data to a stored behavior signature for the user, wherein the behavior signature is based on information aggregated by one or more user devices associated with the user;
determine at least a portion of the extracted data matches the stored behavior signature for the user; and
provide access to the network resource in response to the determination that at least a portion of the extracted data matches the stored behavior signature for the user.

16. The computer program of claim 15, wherein the behavior signature comprises location information for the user.

17. The computer program of claim 15, wherein extracting the data from the one or more blocks comprises identifying the one or more blocks from within a predetermined time period of the identified blockchain.

18. The computer program of claim 15, wherein the behavior signature comprises user activity information associated with the one or more user devices.

19. The computer program of claim 15, wherein:
the identified blockchain is the semi-private blockchain; and
extracting the data from the one or more blocks comprises discarding data from one or more anonymized blocks.

20. The computer program of claim 15, wherein the behavior signature comprises biometric information for the user.

* * * * *